United States Patent [19]

Graham

[11] Patent Number: 5,465,051
[45] Date of Patent: Nov. 7, 1995

[54] FOUR-TERMINAL RESISTOR METHOD FOR MEASURING ELECTRIC CURRENT IN COWS

[75] Inventor: Martin H. Graham, Berkeley, Calif.

[73] Assignee: And Yet, Inc., Berkeley, Calif.

[21] Appl. No.: 228,148

[22] Filed: Apr. 15, 1994

[51] Int. Cl.$^6$ ................................................. G08B 21/00
[52] U.S. Cl. ........................ 324/713; 324/715; 340/650; 361/42
[58] Field of Search ................................. 324/71.1, 509, 324/510, 555, 692, 713, 715; 119/14.03, 14.08, 14.14; 340/650, 651; 361/42, 43

[56] References Cited

U.S. PATENT DOCUMENTS

| | | | |
|---|---|---|---|
| 4,398,188 | 8/1983 | Feigal et al. | 340/650 |
| 4,401,055 | 8/1983 | Street et al. | 119/14.03 |
| 4,468,837 | 9/1984 | Nijhuis | 452/58 |
| 4,551,633 | 11/1985 | Winter et al. | 119/14.08 |

OTHER PUBLICATIONS

American Society of Agricultural Engineers, Stray Voltage: Proceedings of the National Stray Voltage Symposium, 1–186, Oct. 10–12, 1984, Syracuse, N.Y. (month unav.).
C. T. Baldwin, Methods of Electrical Measurement, 14–15, 31–32, 1952, London, England (month unav.).
Ernest Frank, Electrical Measurement Analysis, 273–274, 1959, USA (month unav.).
Northeast Regional Agricultural Engineering Service Milking Systems and Milking Management, 34–49, Jan. 13–14, 1988, Harrisburg, Pa.
Melville B. Stout, Basic Electrical Measurements, 80, 1950, USA (month unavailable).
United States Department of Agriculture, Effects of Electrical Voltage/Current on Farm Animals, 1–1 to 9–4, Dec. 1991, USA.

*Primary Examiner*—Kenneth A. Wieder
*Assistant Examiner*—Christopher M. Tobin
*Attorney, Agent, or Firm*—Blakely, Sokoloff, Taylor & Zafman

[57] ABSTRACT

A method for measuring the current flowing through a cow is disclosed. The method uses a four-terminal resistor precision measurement technique to accurately measure the electric current flowing through a cow as a result of voltages found on dairy farms. The four-terminal resistor technique allows the present invention to measure the current without the need to account for unpredictable environmental conditions on the dairy farm that may effect electrical contact resistances. The present invention uses Ohm's Law to determine current by dividing the voltage drop across a conductive path in the cow by the resistance of the conductive path. The elements utilized do not restrict cow movements and allow the cow to move about freely so as to enable dairy farmers to monitor conveniently and continuously for electric currents resulting from stray voltages on the dairy farm without interfering with daily farm activity.

13 Claims, 10 Drawing Sheets

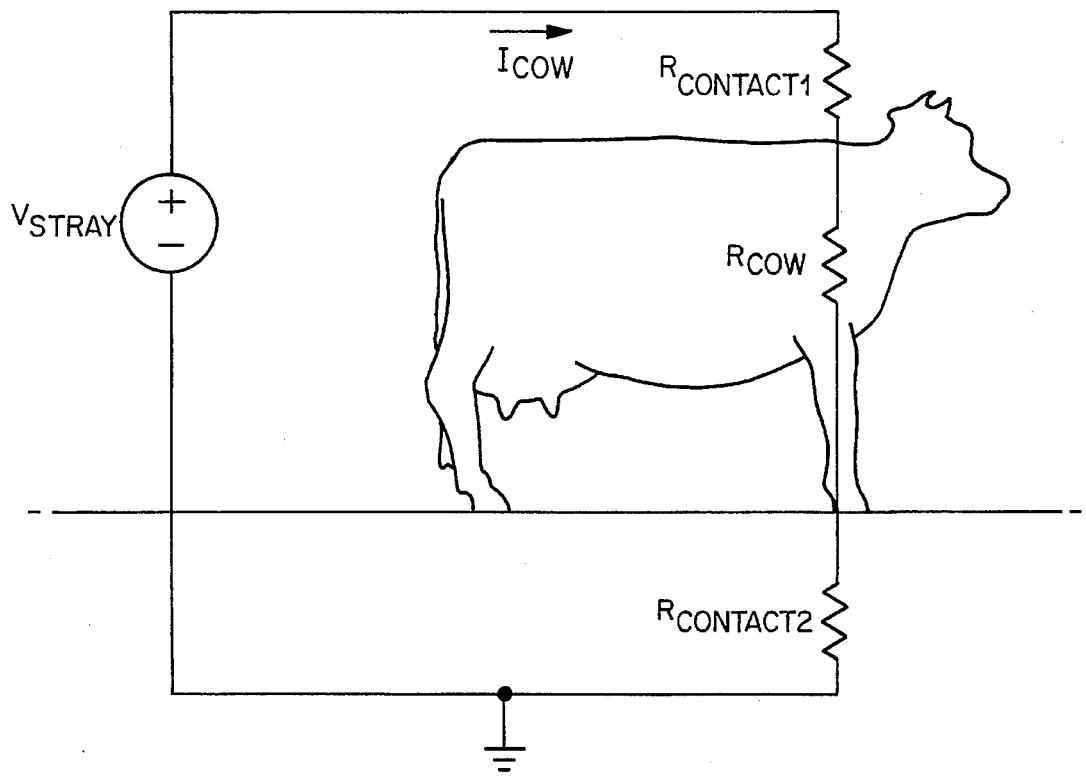
$$R_{TOTAL} = R_{CONTACT1} + R_{COW} + R_{CONTACT2}$$
$$R_{COW} = \frac{V_{STRAY}}{R_{TOTAL}}$$
FIG __ 1 (PRIOR ART)

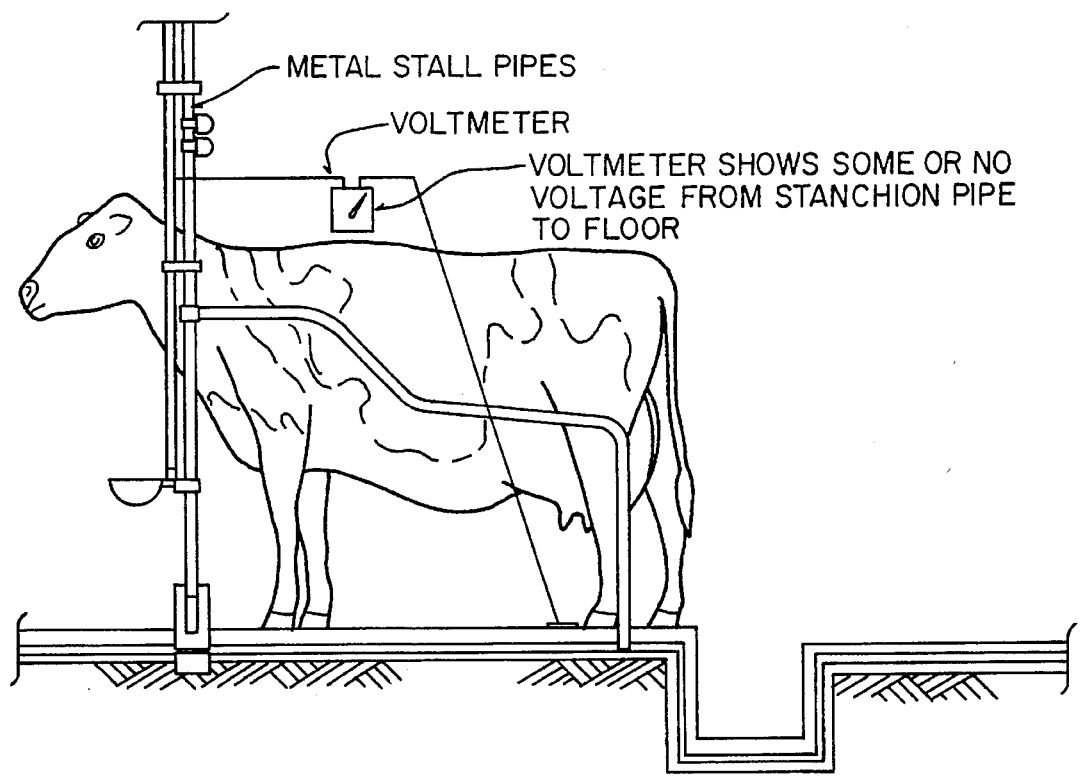
POINT-TO-POINT MEASUREMENTS
FIG __ 2 (PRIOR ART)

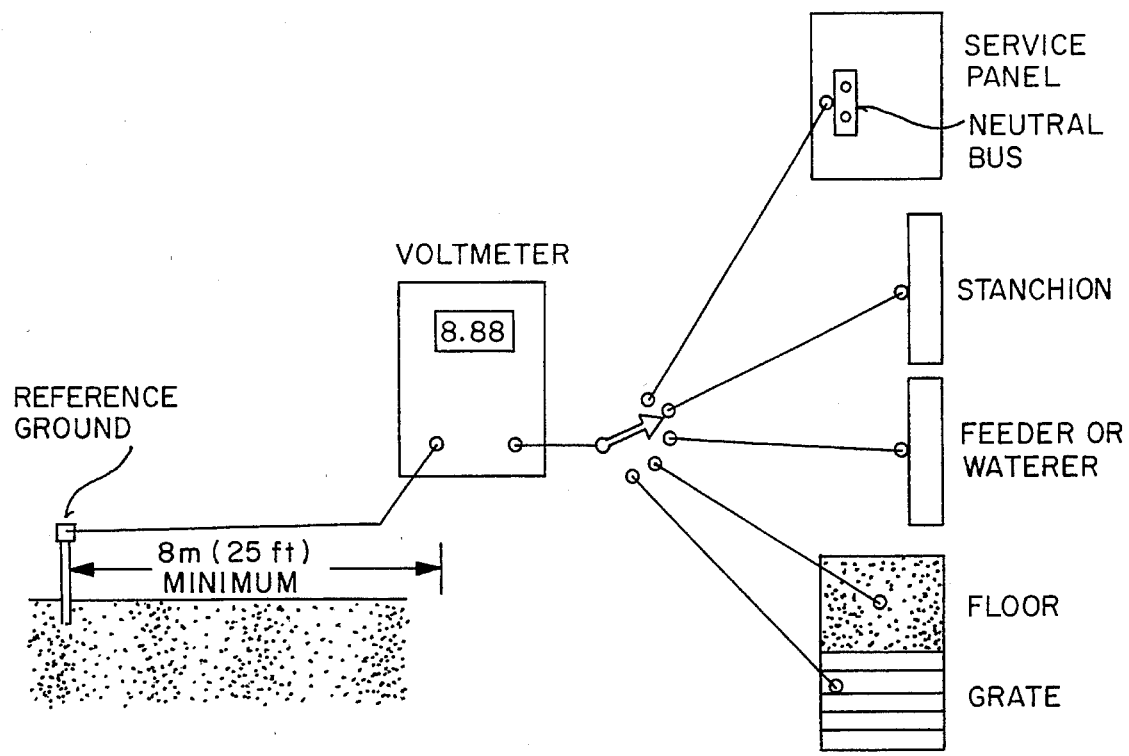
POINT-TO-REFERENCE GROUND MEASUREMENTS
FIG _ 3 (PRIOR ART)

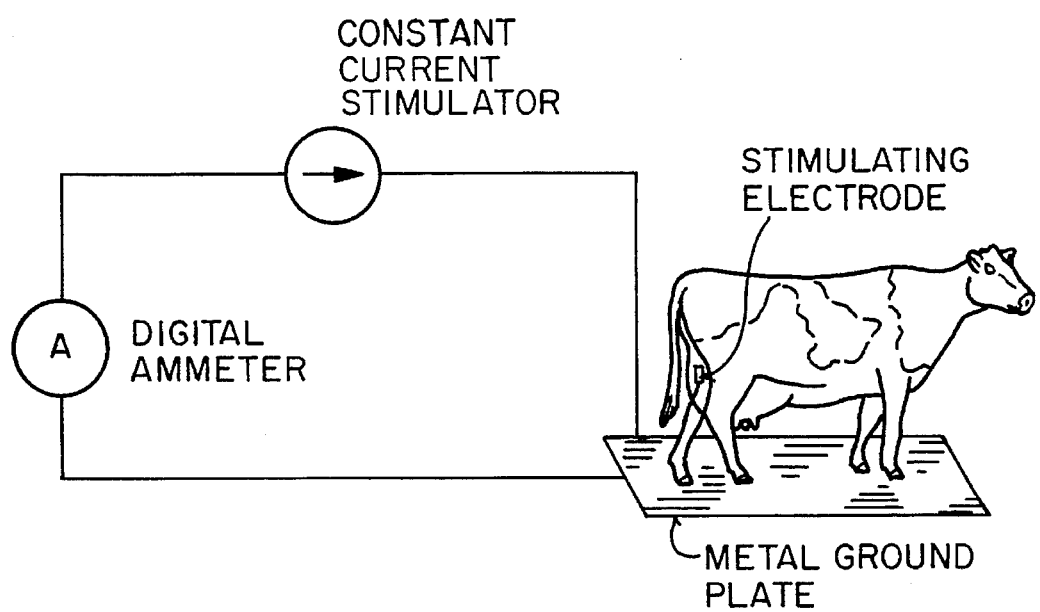
FIG _ 4 (PRIOR ART)

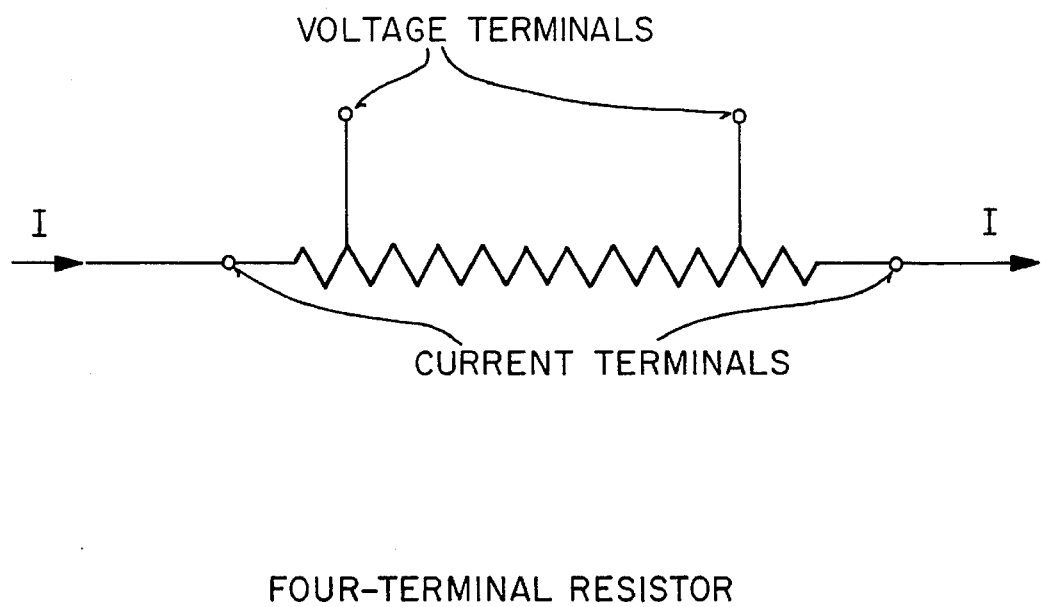
FOUR-TERMINAL RESISTOR
FIG _ 5 (PRIOR ART)

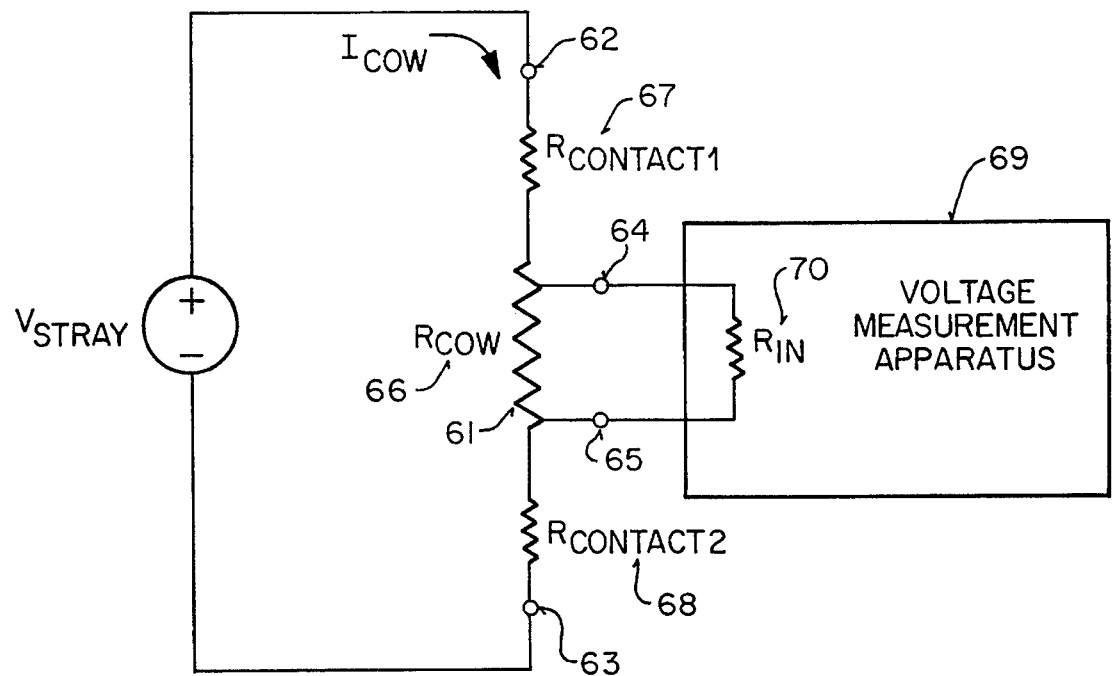
THE COW AS A FOUR-TERMINAL RESISTOR
FIG_6

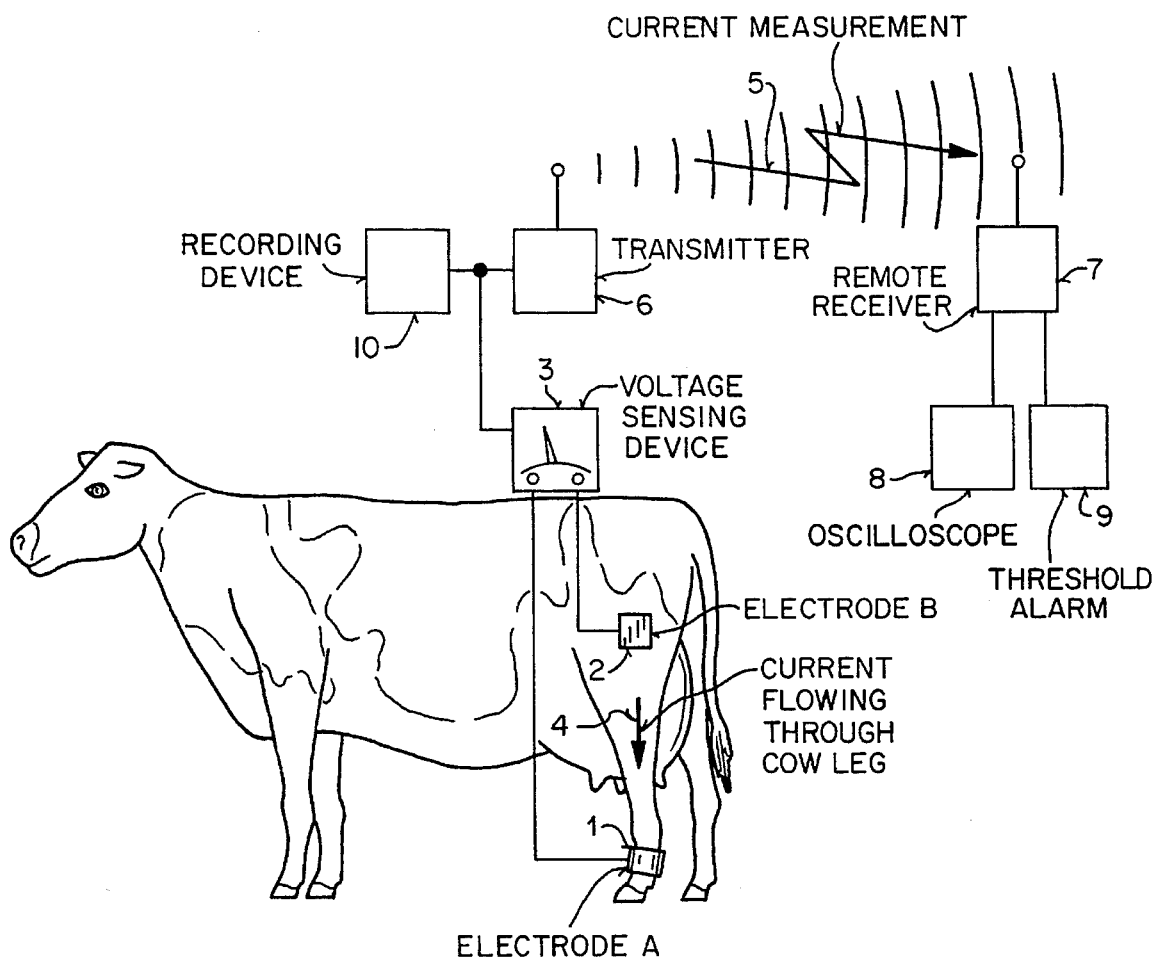
FIG_7

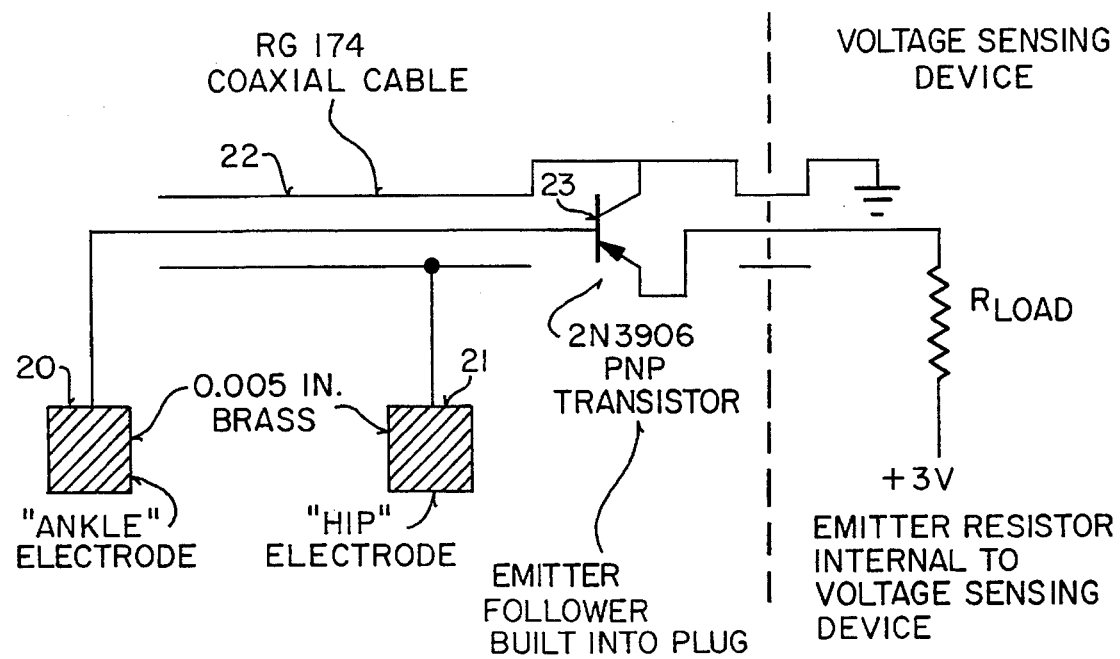
FIG_8

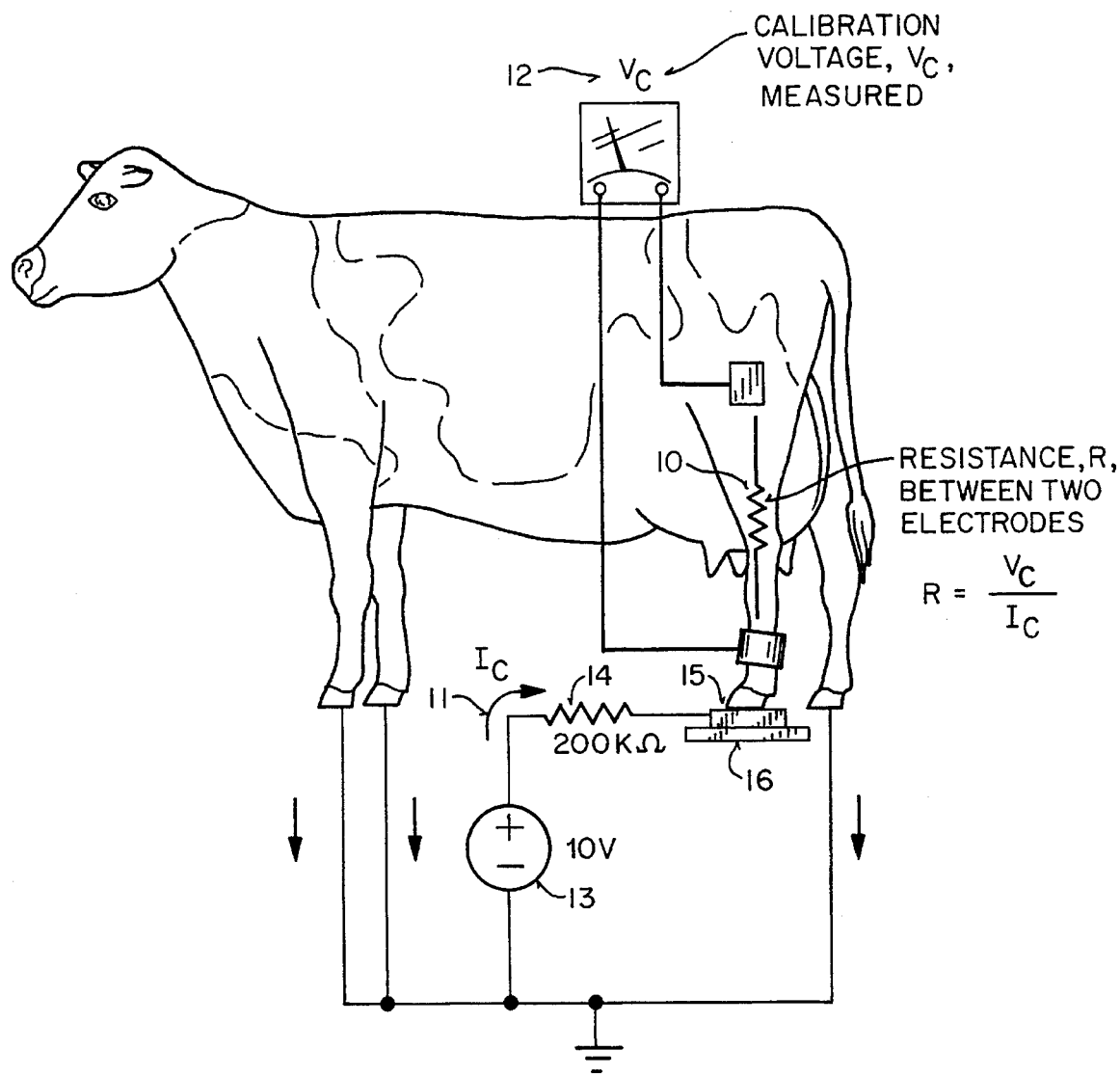
FIG_9

FOUR-TERMINAL RESISTOR METHOD FOR MEASURING ELECTRIC CURRENT IN COWS

BACKGROUND OF THE INVENTION

A. Field of the Invention

This invention relates to electrical equipment used with farm animals and, more particularly, to methods for measuring the electric current flowing through cows.

B. History of the Prior Art

1. Stray Voltages in Farms a. In General

Researchers agree that extraneous electrical voltages and their resulting currents found on dairy farms have physiological and behavioral effects on cows. Although animals are not necessarily effected by voltages per se, animals are affected by the currents that are created from the respective voltages. When compared with humans, cows have been found to be more sensitive to electric currents. The concept of electric current flowing through a cow can be illustrated using Ohm's Law:

$$I = \frac{V}{R} \qquad \text{Equation (1)}$$

Assuming the cow has a body resistance $R_{COW}$, the resulting current $I_{COW}$ is related to the given voltage $V_{STRAY}$, as shown in FIG. 1.

In addition to $R_{COW}$, the amount of actual current that flows through the cow is also related to the electrical resistance of the contact points that have stray voltage. As shown in FIG. 1, the current $I_{COW}$ is determined by dividing the stray voltage value, $V_{STRAY}$, with the total series resistance, $R_{TOTAL}$:

$$I_{COW} = \frac{V_{STRAY}}{R_{TOTAL}} \qquad \text{Equation (2)}$$

where:

$$R_{TOTAL} = R_{CONTACT1} + R_{COW} + R_{CONTACT2} \qquad \text{Equation (3)}$$

$R_{CONTACT1}$ and $R_{CONTACT2}$ represent series contact resistances of the entry and exit points of the electric current $I_{COW}$.

Unpredictable environmental conditions on dairy farms may cause the series resistance contact points to be good conductors at some times, but poor conductors at other times. For example, if a cow touches a contact point that is covered with dry dirt, the electrical connection would be not as good as a contact point that is wet or damp from manure or urine. The wet or damp contact point would have less resistance than the dry contact point. As a result of the unpredictable $R_{CONTACT1}$ and $R_{CONTACT2}$ values, there is a high degree of variance in $R_{TOTAL}$ and a corresponding variance in $I_{COW}$, even though the voltage reading, $V_{STRAY}$, may be constant.

b. Causes of Stray Voltages in Farms

Modern dairy farms typically feature an assortment of electrical equipment which may have unknown faults. These faults create stray voltages on dairy farms which may effect cows. Such electrical faults may arise as a result of poor electrical connections, corrosion of switches, frayed insulation, faulty equipment, or heavily loaded power lines. Since many of these faults do not result in equipment failure, the existence of these electrical faults is not always readily apparent. Accordingly, dairy farmers are often unaware of conditions that may cause cows to suffer the effects of stray currents.

c. Cattle Responses to Stray Current

The effects of electric currents in cows vary depending on the sensitivity of the individual cow. Studies have linked the effects of stray currents in cows to lower yields in milk production and increased milking times. Other observed responses include: 1) increased incidence of mastitis, 2) elevated somatic cell counts, 3) incomplete milk letdown, 4) extreme nervousness while in the milking parlor, 5) reluctance to enter the milking parlor, 6) rapid exit from the parlor, 7) reluctance to use water bowls or metallic feeds, and 8) altered consumatory behavior ("lapping" of water from the watering device). Since these results are generally undesirable, dairy farmers are interested in methods to identify the times that cows suffer from these effects to prevent the negative consequences.

d. Prior Stray Voltage Detection Methods

In order to detect the existence of stray currents in cows, researchers have used generally two methods: 1) the measurement of voltage between point-to-point, and 2) the measurement of voltage from point-to-reference ground.

Referring to FIG. 2, the measurement of voltage point-to-point involves measuring the voltage between two points which the cow may contact at the same time. Commonly used points include metallic structures, such as metal stall pipes, and the floor. Thus, similar to FIG. 1, a resulting current can be determined by dividing the measured voltage with the series resistances of the body of the cow and the respective contact points that touch the cow.

Referring to FIG. 3, the measurement of voltage from point-to-reference ground involves measuring the voltage between various metallic equipment the cow may touch, such as a stanchion, metallic feeder, or waterer, and a reference ground. When using the point-to-reference ground method, a ground rod must be driven into the earth to a depth of at least four feet at a distance of at least twenty-five feet from any electrical system grounding electrode. The point-to-reference ground method generally returns higher voltage readings than the point-to-point method and is more useful in identifying specific sources of stray voltages. Similar to the previously described point-to-point method, a resulting current can be determined by dividing the measured voltage with the series resistances of the body of the cow and the corresponding external contact resistance points.

Each of the above referenced detection methods has drawbacks. First, neither of the detection methods continuously monitor for the existence of stray current flowing through a cow at any given time. Each method relates only to the times a cow touches the preconfigured contact points. In addition, the measured voltage readings do not accurately convey the actual current flowing through a cow because of the high degree of variance in contact point resistances.

Other shortcomings to consider are the requirements of having to drive a ground rod into the earth for point-to-reference measurements or the expense of having to install cables in the milking facilities to accommodate the measurement techniques. These requirements may be impractical for some dairy farmers to implement. In addition, since cows must physically touch the contact points, the techniques may be more suited for simply identifying specific sources of stray current instead of detecting the actual presence of stray current flowing through a cow.

e. Other Cow Measurement Schemes

While conducting studies, researchers have employed a number methods to measure resistance values between points on a cow. These techniques have included having the cow stand on top of a metallic plate, and/or physically attaching electrodes to the body of the cow, as shown in FIG. 4. In some instances, efforts were made to reduce the effects of the contact resistances in measurements by attaching the electrodes to shaven areas of the cow with conducting paste. The metallic plates and electrodes are correspondingly coupled to the current measuring equipment with cables to complete a "cow circuit." To determine a resistance value, researchers applied known voltages to the cows and measured the corresponding current flow. Using Ohms Law, resistance values could be determined.

Although this technique may be useful to measure the electrical resistance in cows, its use is impractical for measuring the current in cows that results from stray voltages found on ordinary dairy farms. Furthermore, such measurements are still effected by variable contact resistances, even though the effects of the resistances are reduced with the use of metallic plates and the conducting paste. Moreover, the technique is limited in use to the times that a cow is physically interfaced with the measuring apparatus. Thus, in order to monitor continuously the current flowing through a cow, prior art methods confine the cows to limited areas since the cow must remain physically connected to stationary measuring equipment. Depending on the technique used, the cow cannot walk off of the metallic plate or the cow cannot move a distance greater than the length of the test cable from the current measuring hardware. Accordingly, it is impractical for dairy farmers to monitor the current flowing through cows continuously and continue daily milking activity using prior art techniques. In order to be effective, such techniques would impose severe limitations on dairy farm environments.

2. Four Terminal Resistor Measurements

A technique researchers use when making measurements of low resistances is to use a four-terminal resistor. This technique is used because one of the difficulties researchers encounter when making such precision measurements is caused by the contacts between the resistor and its connecting wires. This configuration has been used for devices such as ammeter shunts and other low resistance precision standards.

FIG. 5 illustrates a four-terminal resistor. When making precision measurements, contact resistances can have a high degree of variance. Conditions which may effect the precision measurements include the mechanical pressure of the contact as well as the physical condition of the contact surfaces. The outer pair of terminals provide a current connection and the inner pair of terminals provide a voltage connection. The resistance between the inner pair of terminals does not include the contact resistances of the outer pair of terminals and is therefore independent of varying resistances that may occur as a result of unpredictable physical conditions at the outer terminals.

An additional benefit of the four-terminal resistor configuration is that the contact resistances of measurement apparatus at the inner terminals is of no importance. Assuming a measurement apparatus with a sufficiently high input impedance, the voltage drop across the two inner terminals can be measured without drawing current from them. Since there is no current drawn, there can be no voltage drop across the contact resistances at the inner terminals. Hence, the contact resistances at the inner voltage terminals are immaterial.

II. SUMMARY OF THE INVENTION

It is therefore an object of the present invention to provide an unintrusive method for continuously, accurately, and reliably measuring the electric current flowing in a cow. Such a method could be used by dairy farmers to identify, locate, and detect stray voltage conditions on the farm that could result in cow discomfort and corresponding losses in milk production. It is an additional object of the present invention to provide a method for recording the measured electric current values to make the measured readings available for subsequent analysis and study.

The method is realized by utilizing the four-terminal resistor precision measurement technique with a cow. This technique provides for precision measurements of electric current flowing through a cow and is independent of the unpredictable environmental conditions found on farms that may effect contact resistances between the cow and stray voltage sources.

The present invention is realized by attaching to a cow two sensing electrodes that measure the voltage drop between two locations on the cow. These two locations correspond to the inner voltage terminals of a four-terminal resistor. It is assumed that the stray electric current enters and exits the cow at two locations that correspond with the outer current terminals of a four-terminal resistor.

The two sensing electrodes are connected to a voltage sensing device with a high input impedance. The voltage sensing device is also attached to the cow. Once the cow's body resistance between the two locations is determined, the current flowing through the cow between the two locations can be determined at any time by dividing the measured voltage between the two locations by the body resistance of the cow. In the currently preferred embodiment, the voltage sensing device also includes a transmitting device which allows data to be transmitted to a remote receiver. The voltage sensing device may also include a recording device which provides a means for storing data for subsequent analysis and study. Thus, the described method provides for continuous, accurate, and reliable monitoring of electric current flow through a cow without unnecessarily interfering with ordinary dairy farm activity.

III. BRIEF DESCRIPTION OF THE DRAWINGS

FIG. 1 is a diagram illustrating the prior art method of using Ohm's Law to relate electric voltage, current, and resistance in a cow.

FIG. 2 is an illustration representing the prior art method of detecting stray voltage using a point-to-point technique.

FIG. 3 is an illustration representing the prior art method of detecting stray voltage using a point-to-reference ground technique.

FIG. 4 is an illustration representing the prior art method of applying a current to a cow by physically attaching a cable to the cow and having the cow stand on a metal ground plate.

FIG. 5 is an illustration of a four-terminal resistor.

FIG. 6 is an illustration representing how the present invention utilizes a four-terminal resistor technique for accurately measuring voltage in a cow.

FIG. 7 is an overall diagram of the present invention showing the two electrodes attached to the cow and coupled to a sensing device to measure the voltage and current.

FIG. 8 is a diagram illustrating the coaxial cable and electrodes used by the present invention to couple the two electrodes to the voltage sensing device.

FIG. 9 is a diagram illustrating the circuit used to determine the resistance of the conductive path through the cow.

IV. DETAILED DESCRIPTION

Figures 10A, 10B:
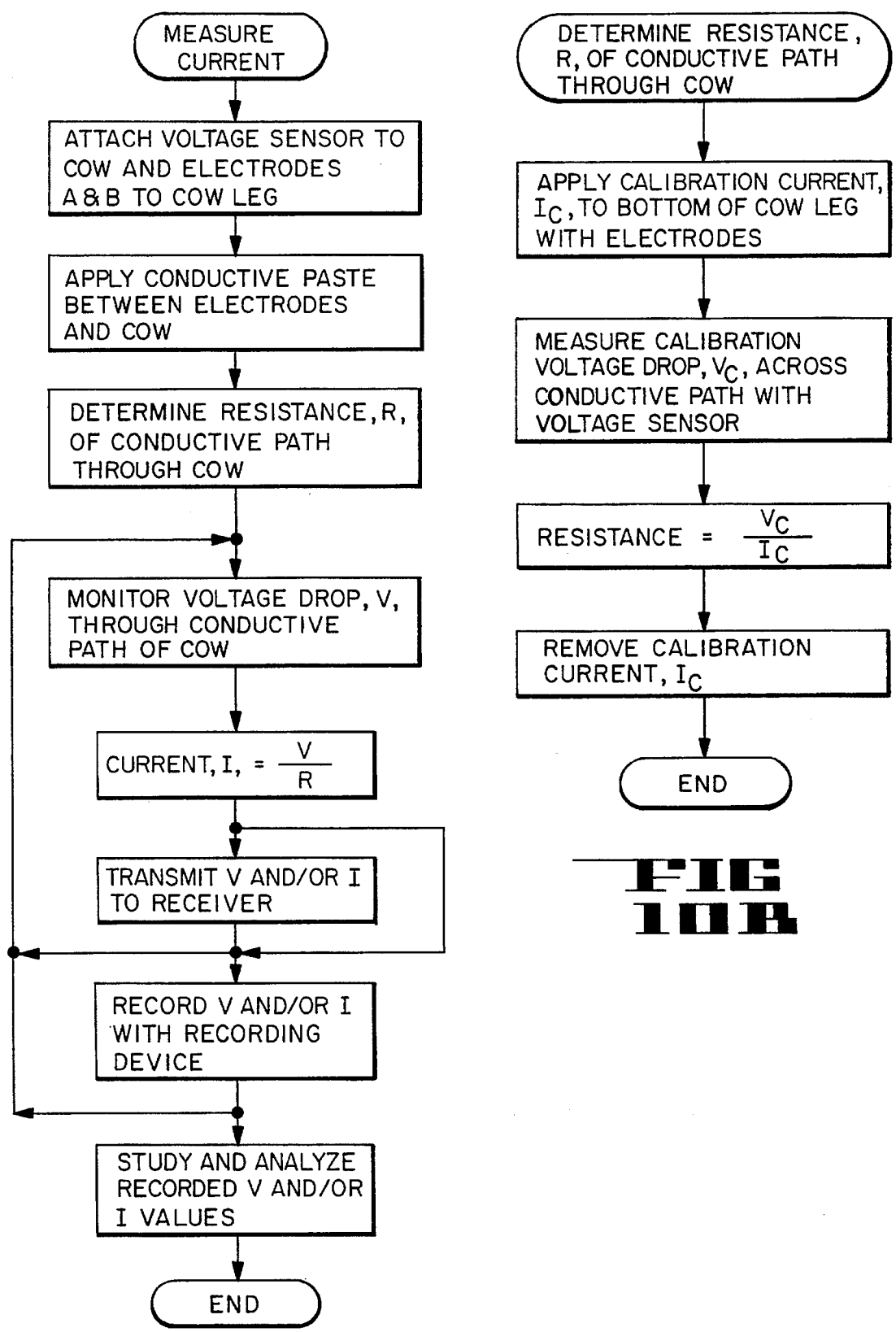
FIG. 10a is a chart illustrating a method in accordance with the present invention to measure the current flowing through a cow.
FIG. 10b is a chart illustrating a method in accordance with the present invention to determine the resistance of the conductive path through the cow.

A method for measuring current that flows through a cow is described. In the following description, numerous specific details are set forth in order to provide a thorough understanding of the present invention. It will be obvious, however, to one skilled in the art that the present invention may be practiced without these specific details. In other instances, the details of well-known circuitry are not shown here in order not to obscure the present invention unnecessarily.

1. Use of Prior Art Concepts

The present invention makes use of Ohm's Law to determine an electric current flowing through a circuit by measuring the voltage drop across a circuit element and computing the current flow by dividing the voltage drop by the circuit element resistance value. FIG. 1 shows a cow in an electric circuit with a voltage $V_{STRAY}$ applied to the cow, having a body resistance $R_{COW}$, and the resulting current $I_{COW}$, which is the quotient of $V_{STRAY}$ and $R_{TOTAL}$, where $R_{TOTAL}$ is the sum of all of the series resistances in the circuit.

In addition, the present invention also applies the concepts used in four-terminal resistor measurements to determine the electric current flowing through a cow. Utilization of four-terminal resistor concepts allows the present invention to make accurate current measurements without having to consider the varying contact resistances at the entry and exit points of the stray electric current flowing through the cow.

2. Presently Preferred Embodiment and Method a. The Cow Is A Four-Terminal Resistor

Referring to FIG. 6, the presently preferred embodiment regards the cow as a four-terminal resistor 61. Stray current entry and exit points correspond with the outer current terminals 62 and 63. Two electrodes are attached to the cow to measure the voltage drop across a portion of the cow's body. The attachment points of the two electrodes correspond with the two inner voltage terminals 64 and 65. The electrical resistance of the portion of the cow's body corresponds with the electrical resistance $R_{COW}$ 66 of the four-terminal resistor and the contact resistances found at the stray current entry and exit points correspond with the respective contact resistances $R_{CONTACT1}$ 67 and $R_{CONTACT2}$ 68 found at the outer current terminals of the four-terminal resistor. In addition, the presently preferred embodiment utilizes a voltage measurement apparatus 69 with a high input impedance $R_{IN}$ 70 so as to reduce or eliminate the effects of any contact resistance present at the inner voltage terminals.

b. Electrodes and Cable

The currently preferred embodiment, as shown in FIG. 7, illustrates the method described by the present invention. Electrode A 1 is attached to the ankle of the cow and electrode B 2 is attached to the hip of the cow. Electrodes A and B are also coupled to voltage sensing device 3 and the current 4 flowing through the cow's leg is determined by the voltage sensing device. The current measurement 5 is then transmitted with transmitter 6 to a remote receiver 7 allowing continuous monitoring of electric current flowing through the cow.

In the currently preferred embodiment, a 0.005 inch thick brass plate is used for the electrodes 20 and 21 and a RG 174 coaxial cable 22 is used to couple the electrodes to the voltages sensing device, as shown in FIG. 8. In addition, an internal 2N3906 emitter follower PNP transistor 23 is built into the coaxial cable plug. The transistor base is coupled to the ankle electrode and the transistor collector is coupled to the hip electrode. Use of the emitter follower in the cable provides current gain and requires less power from the signal source to drive a given load than would be the case if the signal source were to drive the load directly.

An additional benefit of using the emitter follower is its inherent high input impedance characteristics. Assuming the emitter follower has a transistor beta of $h_{fe}$ and there is an output load resistance of $R_{LOAD}$, the equivalent input resistance $R_{IN}$ will appear to be:

$$R_{IN}=(h_{fe}+1)R_{LOAD} \hspace{2cm} \text{Equation (4)}$$

The transistor beta ($h_{fe}$) of a 2N3906 is typically about 200, so as a low impedance load will look like a much higher impedance at the base and will be much easier to drive.

c. Transmitter and Receiver

To observe measured electric currents flowing through the cow, the currently preferred embodiment uses a wireless remote microphone system for video cameras. The wireless microphone system comprises a transmitter and a remote receiver to provide data communications without restrictive cables that prevent the cow from moving freely. The transmitter and receiver used in the currently preferred embodiment feature two FM radio frequencies, or channels, to allow data communications. The frequencies used are 49.830 MHz and 49.890 MHz. The output is read from the earphone jack of the remote receiver. Accordingly, the presently preferred embodiment could be used on a plurality of cows in the same area for simultaneous monitoring for electric current so long as data transmissions from each respective cow are on independent channels. In addition, all of the cows can be monitored from a single location. The maximum number of cows that can be simultaneously monitored can be raised by increasing the number of available channels for data transmission.

When using a wireless remote microphone system for video cameras to transmit data, a factor to consider is that the transmitter and receiver must have the ability to communicate lower frequency data signals since stray voltages on dairy farms are typically low in frequency. In the currently preferred embodiment, a SIMA Products Corporation mini SoundCatcher Wireless Remote Microphone System is used to implement the transmitter and receiver means. The coaxial cable is coupled to the microphone jack of the transmitter. Since the audio bandwidth in the SoundCatcher system does not go low enough to provide effective data transmission, the audio coupling capacitors in the transmitter and receiver were increased in value so as to enable a bandwidth extending to less than 20 Hz for transmitted data.

Although a wireless remote microphone system for video cameras is used in the currently preferred embodiment, other wireless communications means may be used to observe the stray current readings in the cow remotely. Other communications means may operate at different radio frequency bands and provide wireless data communications with greater range, less weight, or less power consumption.

d. Viewing the Signal with an Oscilloscope

Once the data signal is received, the voltages may be observed with a variety of equipment. As shown in FIG. 7, the currently preferred embodiment utilizes an oscilloscope

8 to provide real-time visual monitoring of the voltage readings. Accordingly, the oscilloscope inputs are connected to the earphone jack of the remote receiver.

Before actual voltages and currents can be determined, the oscilloscope must be calibrated. Using the presently preferred embodiment, a 10 mV peak-to-peak square wave signal is applied to the transmitter. The signal is then transmitted to the remote receiver through the FM radio signal where the output is read from the earphone jack by the oscilloscope. A square wave signal with a peak-to-peak voltage of 750 mV is observed. Thus, the oscilloscope is calibrated to have a gain of:

$$\frac{750 \text{ mV peak-to-peak}}{10 \text{ mV peak-to-peak}} = 75 \qquad \text{Equation (5)}$$

Accordingly, using the presently preferred embodiment, observed voltage readings on the oscilloscope are divided by 75 to determine actual voltages developed on the cow.

Although the oscilloscope provides a convenient way to observe the voltage readings in the cow visually, other types of measurement equipment, such as a multimeter or equivalent device, could also be used to provide real-time observation of voltage readings.

e. Recording the Signal

Another feature of the present invention is a mechanism to record measured values. The recording mechanism allows measured voltages to be stored for subsequent study and analysis. As shown in FIG. 7, the currently preferred embodiment utilizes a recording device 10 to store measurement data. The recording mechanism can be mounted on the cow in place of the transmitter or be used in conjunction with the transmitter and the receiver. Thus, if desired, the recording device can also be coupled to the transmitter or the remote receiver. A variety of different types of recording media can be used with the present invention. In the currently preferred embodiment, a relatively inexpensive tape recorder is used. If measurement data is only needed for subsequent analysis and immediate access to the data is not required, the relatively inexpensive tape recorder can also be used as a substitute for the transmitter and receiver. When compared to the cost of transmitter and remote receiver hardware, this embodiment may provide a savings in overall system cost. However, the inventor notes that digital audio tape technology may be used instead in order to increase the recording quality of low frequency signals.

f. Threshold A/arm

A threshold alarm 9 is coupled to the present invention to monitor for a predetermined threshold voltage, as shown in FIG. 7. When the threshold voltage sensed, the alarm is activated. Using the presently preferred embodiment, the alarm would act as a warning indicator to detect when the cow has encountered a stray voltage exceeding a predetermined magnitude. Thus, the dairy farmer would be notified that the cow was experiencing the effects of electric current.

Like the previously described recording device, the threshold alarm can be mounted on the cow in place of the transmitter or be used in conjunction with the transmitter and the receiver. Hence, the threshold alarm can be mounted on the cow or be coupled to the remote receiver. The alarm could be implemented with a warning lamp, an audio buzzer, or any other equivalent indicator means.

g. Attaching the Hardware to the Cow

As previously stated, electrode A is attached to the cow's ankle and electrode B is attached to the cow's hip above electrode A. To ensure a more reliable conductive path between the two electrodes, conductive paste is applied between each electrode and the cow. The voltage sensor is attached to another location on the cow, for example, the cow's back, and each of the electrodes is coupled to the voltage sensor with coaxial cable, ordinary wires, or other equivalent signal line means. Attachment to the cow of the electrodes and the voltage sensor can be achieved by any number of methods, so long as the reliable conductive path between the two electrodes through the cow is maintained. Suggested methods for attaching the electrodes and voltage sensor include the use of adhesive tape or straps.

In the currently preferred embodiment, duct tape is used to attach all of the hardware to the cow and ordinary toothpaste is used as a conductive paste. Toothpaste is used since it helps provide a more reliable conductive path between the electrodes and the cow's body. Duct tape is used to fasten all of the cables to the cow securely and is exceptionally suited for these purposes because of the relative strength and durability. Moreover, the duct tape not only fastens the electrodes and voltage sensing device to the cow, but it also serves as an insulator to prevent metallic objects and other electrically conductive items from short circuiting elements of the present invention. In addition, the tape protects elements of the present invention from getting detached or disconnected in the event the cow collides with external objects while moving.

The inventor notes that present invention's use of a four-terminal resistor reduces the need to minimize contact resistance at the electrodes. Thus, the use of toothpaste to lower the contact resistances of the electrical connections between the electrodes and the cow is not a critical element of the presently preferred embodiment. However, the use of toothpaste and duct tape help to secure reliable and consistent electrical connections.

In addition, although duct tape is used by the presently preferred embodiment, other equivalent means for attaching the items to the cow may be used so long as the cow is able to move freely with minimal interference. Other means for attaching the items to the cow include other types of adhesive tape, such as electrical, masking, mailing tape, or other types of fasteners which may include belts or Velcro straps.

h. Determining the Body Resistance

Before the values of the actual currents that flow through the cow can be calculated, the electrical resistance of the conductive path between the two electrodes must be determined. As shown in FIGS. 9 and 10*b,* the resistance R 10 between the two electrodes can be calculated by applying a predetermined calibration current $I_C$11 to the bottom of the cow's leg that has the connected electrodes. The calibration current will flow up the cow's leg, through the conductive path between the two electrodes, and then to ground through the remaining three cow legs. The voltage drop between the two electrodes $V_C$12 can be observed with the voltage sensor as the calibration current flows through the conductive path. Using Ohm's Law, the resistance R can be determined by dividing the measured voltage by the calibration current.

In the presently preferred embodiment, the calibration current is created with a current source comprised of a 10 V peak to peak voltage source 13 with one lead connected to electrical ground, and the other lead connected to a 200 KΩ resistor 14 as shown in FIG. 9. The 200 KΩ resistor is then connected to metallic pad 15 which the cow stands on with the leg that has attached electrodes. The plate is insulated from the ground by placing it on top of a Lucite plate 16 As a result, the cow leg with the attached electrodes is isolated from ground while the remaining three legs are attached to ground.

Assuming the body resistance of the cow is significantly smaller than 200 KΩ, the current flowing from the voltage source through the cow leg can be computed using Ohm's Law:

$$I = \frac{V}{R} = \frac{10\text{ V}}{200\text{ K}\Omega} = 0.05\text{ mA} \qquad \text{Equation (6)}$$

Assuming a 0.05 mA current source, the resistance of the conductive path between the electrodes can now be determined by measuring the voltage drop between the two electrodes. Using the presently preferred embodiment, the voltage drop was found to be 6.7 mV±15%. Accordingly, the conductive path resistance is:

$$R = \frac{V}{I} = \frac{6.7\text{ mV}}{0.05\text{ mA}} \approx 130\ \Omega \pm 15\% \text{ or } 110 \text{ to } 150\ \Omega \qquad \text{Equation (7)}$$

i. Determining Current Variation

Observing that the voltage variation with no current in the cow leg is less than 0.3 mV peak-to-peak, the corresponding current variation within the conductive path would be:

$$I = \frac{V}{R} = \frac{0.3\text{ mV}}{130\ \Omega} \approx 0.0023\text{ mA peak-to-peak} \qquad \text{Equation (8)}$$

Thus, electric currents can be measured with the presently preferred embodiment to better than 10% accuracy if the currents are at least:

$$(10)(0.0023\text{ mA}) \approx 0.02\text{ mA} \qquad \text{Equation (9)}$$

j. Measuring the Current

After the conductive path resistance is computed, the calibration current source is removed and the cow can move about freely. By monitoring the voltage readings with the voltage sensing device, the current flowing through the cow can be ascertained at any time using Ohm's Law by dividing the measured voltage drop by the computed resistance. In addition, the presently preferred embodiment may be used to measure two or more currents in different parts of the cow simultaneously. For example, such measurements can be made in each of the four legs. Knowledge of such simultaneous electric currents with their corresponding directions in multiple portions of a cow can further assist dairy farmers to detect and identify the source and nature of stray voltages conditions found on farms.

As discussed above, this method will allow dairy farmers to monitor and detect electric current flowing through cows continuously during ordinary dairy farm activities. By using the ability to detect current flowing through these cows, dairy farmers will have an increased awareness of any stray voltages that may exist. As a result, the dairy farmers can take appropriate measures to eliminate any detected stray voltage problems cows may encounter and reduce the likelihood of the negative physiological or behavioral effects of electric currents in cows as discussed above.

Thus, a method for measuring the electric current flowing in a cow has been described. Although the present invention has been described in terms of a preferred embodiment, it will be appreciated that various modifications and alterations might be made by those skilled in the art without departing from the spirit and scope of the present invention.

What is claimed is:

1. A method for measuring a current flowing through a cow, the current entering the cow at an entry location and the current leaving the cow at an exit location, the method comprising the steps of:

attaching a first electrode to a first location on the cow, the first location located between the entry point and the exit point, the first electrode coupled to a voltage sensing device, the voltage sensing device attached to a fifth location on the cow;

attaching a second electrode to a second location on the cow, the second location located between the entry location and the exit location, the second electrode coupled to the voltage sensing device;

electrically coupling a third location on the cow to an electrical ground such that the second location on the cow is between the first and third locations;

applying a calibration current to a fourth location on the cow such that the first location on the cow is between the second and fourth locations and the calibration current flows through the cow from the fourth location to the third location;

measuring a calibration voltage drop between the first and second locations on the cow with the voltage sensing device while the calibration current is applied;

determining an electrical resistance between the first and second locations on the cow by dividing the calibration voltage drop by the calibration current;

removing the calibration current from the cow;

monitoring a voltage drop between the first and second locations on the cow with the voltage sensing device; and determining the current flowing through the cow by dividing the voltage drop by the electrical resistance.

2. The method defined by claim 1 wherein the first location on the cow is located on an ankle of a first leg on the cow, the second location on the cow is located on an upper portion of the first leg of the cow, the third location on the cow is located on a foot of a second leg of the cow, and the fourth location on the cow is located on a foot of the first leg of the cow.

3. The method defined by claim 2 wherein the voltage sensing device further includes a recording mechanism, wherein the recording mechanism stores the voltage drop between the first and second locations on the cow.

4. The method defined by claim 3 wherein the voltage sensing device further includes a transmitter and a remote receiver, the transmitter coupled to the first and second electrodes, the transmitter transmitting the voltage drop to the remote receiver, the remote receiver providing means for continuous remote surveillance of the voltage drop and the current flowing through the cow.

5. The method defined by claim 4 wherein the voltage sensing device further includes a threshold voltage alarm, the threshold voltage alarm indicating when the voltage sensing device encounters a predetermined voltage.

6. A method for measuring an electric current flowing through a cow, the electric current entering the cow at an entry location and leaving the cow at an exit location, the method comprising the steps of:

attaching first and second electrodes to the cow, the first and second electrodes forming a conductive path and located between the entry and exit locations;

establishing an electrical resistance of the conductive path by applying a calibration current through the conductive path, measuring a calibration voltage drop across the conductive path, and establishing the electrical resistance by dividing the calibration voltage by the calibration current;

monitoring a voltage drop between the first and second electrodes; and determining the electric current by dividing the voltage drop by the electrical resistance.

7. The method defined by claim 6 including the additional step of removing the calibration current from the conductive path before the step of monitoring the voltage drop.

8. The method defined by claim 7 wherein the voltage drop is monitored by a voltage sensing device attached to the cow.

9. The method defined by claim 8 wherein the first electrode is attached to the cow on an ankle a first leg of the cow, and the second electrode is attached to an upper portion of the first leg of the cow.

10. The method defined by claim 8 wherein the voltage sensing device further includes a transmitter and a remote receiver, the transmitter coupled to the first and second electrodes, the transmitter transmitting the voltage drop to the remote receiver, the remote receiver providing means for remote monitoring of the voltage drop and the electric current.

11. The method defined by claim 10 wherein the remote receiver is coupled to an oscilloscope to provide continuous real-time monitoring of the voltage drop and the electric current.

12. The method defined by claim 8 wherein the voltage sensing device further includes a recording mechanism for recording the voltage drop and the electric current for subsequent analysis.

13. The method defined by claim 8 wherein the voltage sensing device further includes a threshold voltage alarm, the threshold voltage alarm indicating when the voltage sensing device encounters a predetermined voltage.

* * * * *